Oct. 29, 1935.     K. FEILCKE     2,019,180
UNIT POWER PLANT
Original Filed April 3, 1929    2 Sheets-Sheet 1
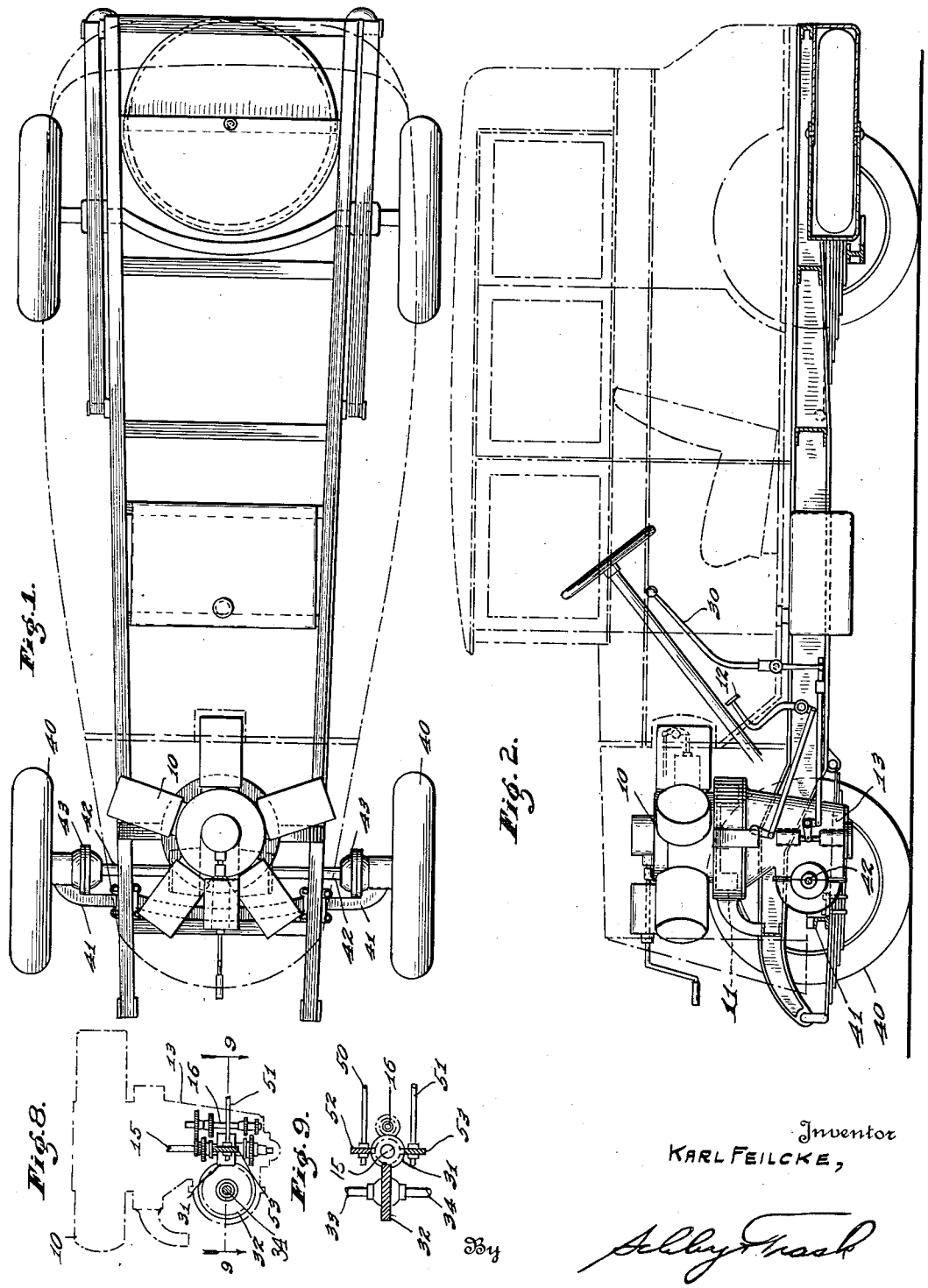
Inventor
KARL FEILCKE,
Attorneys

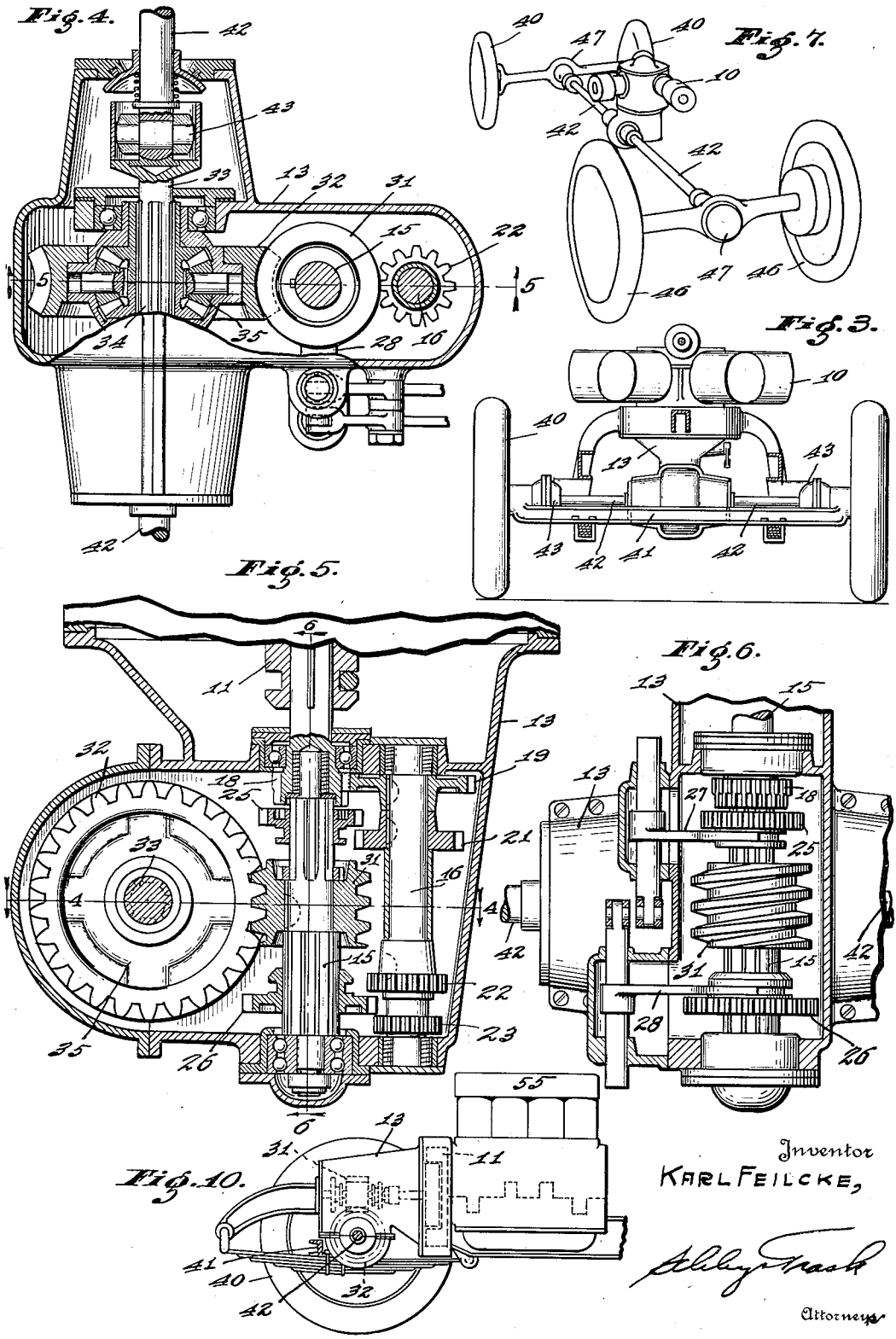

Patented Oct. 29, 1935

2,019,180

UNITED STATES PATENT OFFICE 2,019,180

UNIT POWER PLANT

Karl Feilcke, Indianapolis, Ind.

Application April 3, 1929, Serial No. 352,290
Renewed May 9, 1934

3 Claims. (Cl. 180—44)

It is the object of my invention to produce an automobile drive mechanism—i. e., an arrangement of engine, clutch, change-speed transmission mechanism, and propeller shaft or shafts—which, by reason of a novel disposition of parts, particularly those of the transmission, requires less chassis space than do similar structures now in use; which will simplify the construction of the vehicle, reduce the number of parts and therefore the cost, and decrease both sprung and unsprung weight; and which, particularly in a front-wheel or four-wheel drive automobile, will give an especially advantageous weight distribution. A further object of my invention is to facilitate the successful employment of radial engines in automobiles.

As examples of my invention, I have shown my drive mechanism embodied in automobiles of the front-wheel and four-wheel drive type. In carrying out my invention, I mount the engine with its crank shaft disposed in a plane transverse of the automobile. If a radial engine is to be employed, it may be mounted in a horizontal plane with its crank shaft substantially vertical, the clutch being mounted below the engine and the change-speed mechanism below the clutch. My transmission mechanism differs, particularly with reference to the manner in which power is taken off from it, from transmissions now in common use; for in such common transmissions it is customary to connect the driven shaft to a propeller shaft substantially in line with it, whereas I take power off from the driven transmission shaft at a point intermediate its length to drive a shaft disposed generally in a plane perpendicular to that of such driven transmission shaft.

The accompanying drawings illustrate embodiments of my invention: Fig. 1 is a plan of an automobile which embodies a radial engine that drives the front wheels; Figs. 2 and 3 are side and front elevations respectively of the automobile shown in Fig. 1; Fig. 4 is a horizontal section through the transmission of the unit power plant on the line 4—4 of Fig. 5; Fig. 5 is a vertical section through the transmission on the line 5—5 of Fig. 4; Fig. 6 is a vertical section on the line 6—6 of Fig. 5; Fig. 7 is a perspective view illustrating how the power plant shown in Figs. 4, 5, and 6 may be employed in a four-wheel drive automobile; Fig. 8 is a vertical section similar to Fig. 5 but on a smaller scale and illustrating how a power take-off may be embodied in my unit power plant; Fig. 9 is a horizontal section on the line 9—9 of Fig. 8, and Fig. 10 is a view similar to Fig. 2, but showing an automobile which embodies an engine with its cylinders in line.

In the embodiment of my invention illustrated in Figs. 1 to 6 inclusive, and also in Fig. 7, the automobile is driven by a radial engine 10 disposed with its cylinders in a horizontal plane and with its crank shaft axis vertical. Below the engine 10, I provide a clutch 11 which may be of any desired type and which is controlled by the operator through the medium of the usual clutch pedal 12. Below the clutch 11, I mount the transmission mechanism which is enclosed within a suitable casing 13.

The transmission mechanism includes a driven shaft 15, and a counter-shaft 16 as is usual in sliding-gear transmissions, both of these shafts in this instance being disposed generally vertically. The driven shaft 15 is desirably in alinement with the crank shaft of the engine 10 and co-axial with the rotating elements of the clutch 11.

Mounted within the transmission casing 13 and coaxial with the driven shaft 15 is a driving element 18 adapted to be connected with the engine 10 when the clutch 11 is engaged. This driving element 18 has an annular series of gear teeth meshing with a gear 19 which rotates with the counter-shaft 16 and serves to drive such counter-shaft. As is customary, the counter-shaft has rigidly mounted upon it an intermediate speed gear 21, a low-speed gear 22, and a reverse gear 23, the latter of which meshes with an idler (not shown).

Splined to the driven shaft 15 to be rotatable therewith but axially slidable thereon are sliding gears 25 and 26. These gears are shown in the drawings in their neutral position, the gear 26 being movable downwardly into engagement with the reverse idler, or upwardly into engagement with the low-speed drive gear 22; while the gear 25 may be moved downwardly into engagement with the intermediate speed-gear 21 or upwardly into engagement with the gear 18 to provide a direct connection between such gear and the main transmission shaft 15. For the purpose of being connected to the gear 18, the gear 25 is conveniently provided with internal gear teeth which mesh with the teeth of the gear 18 when the gear 25 is moved upwardly from the neutral position illustrated in Fig. 5.

For the purpose of shifting the gears 25 and 26, their hubs are provided with annular grooves adapted to receive shifting yokes 27 and 28 respectively. These shifting yokes are arranged to be moved selectively by the operator through the usual gear-shifting lever 30 which is connected to the shifting yokes by any convenient form of mechanism.

At an intermediate point on the transmission main shaft 15, and desirably between the sliding gears 25 and 26, I mount a worm 31 from which power is taken off from the transmission. As shown in the drawings, the worm 31 meshes with a worm wheel 32 rotatably supported in any convenient manner within the casing 13. Co-axial with the worm wheel 32 and extending in opposite directions therefrom are shafts 33 and 34 adapted to be driven from the worm wheel 32 through a convenient form of differential drive mechanism 35.

The front wheels 40 of the automobile are mounted on the usual front axle 41, and are connected respectively to the shafts 33 and 34 through propeller shafts 42 and universal joints 43. My invention is not concerned with any particular mounting for the front wheels nor with any specific type of universal joint, and these features may take any desired form.

The construction described has many advantages. All the gearing, including the differential gearing, is supported by the vehicle frame, so that the unsprung weight is reduced greatly. Further, the entire weight of the engine, clutch, and transmission mechanism is almost directly over the axle which carries the driving wheels thus insuring ample traction even under adverse conditions. This disposition of the engine, transmission, and clutch relative to the front axle has another advantage in that it effects a great saving of space longitudinally of the automobile and provides greater body capacity for a given length of wheel base or enables the wheel base to be reduced for a given size of body. The transmission driven shaft 15 serves also as the supporting shaft for the worm which drives the differential mechanism, and by this double function of this shaft, a number of expensive parts are eliminated and weight is reduced.

In Fig. 7, I have illustrated an arrangement whereby my drive mechanism may be used in a four-wheel drive automobile. In this arrangement, the engine 10 is mounted as before with its cylinders in a horizontal plane, but the entire power plant is rotated through 90° so that the axis of the worm gear 32 is disposed longitudinally of the automobile rather than transversely thereof. The two shafts 42 extend respectively forwardly and rearwardly from the power plant to drive the front wheels 40 and the rear wheels 46. Since with my invention the entire speed reduction may be obtained in the transmission, the axle gears, having only 1:1 reductions, are smaller than is usual, thus reducing the size of the axle housings 47 and decreasing the unsprung weight.

If desired, either of the shafts 42 shown in Fig. 7 can be eliminated, thus providing a two-wheel rather than a four-wheel drive automobile. If the forward shaft 42 is eliminated, the unit power plant can be moved toward the front end of the frame; and, as its over-all length is less than that of the usual type of unit power plant, a considerable advantage is obtained in the form either of reduced wheel-base length or of increased body space. A further advantage present in this construction is the relatively slow speed at which the propeller shaft 42 rotates owing to the fact that the principal speed reduction is obtained in the transmission rather than in the axle housing. As a result of this relatively slow speed of rotation of the propeller shaft, vibration thereof is greatly reduced and the necessity for intermediate supports is eliminated.

In Figs. 8 and 9, I have illustrated my drive mechanism as provided with two power take-off shafts 50 and 51 driven respectively by worm gears 52 and 53 which mesh with the worm 31 on the transmission driven shaft. These power take-off shafts 50 and 51 can be used to drive any desired power-consuming device, which does not have to be operated when the vehicle is at rest.

Fig. 10 shows my unit power plant embodying an engine 55 of the common type with the cylinders in line, the unit power plant being shown as applied to a front-wheel drive automobile. One advantage of this construction is that space longitudinally of the automobile is conserved as a result of taking the power off from an intermediate point of the driven transmission shaft rather than from the end thereof.

I have not attempted to illustrate or describe all possible embodiments of my invention, and the construction can be varied in different ways. Thus, for example, while I have shown only a sliding-gear type of change-speed transmission mechanism, my invention is not limited to this type; as I can take power away from the transmission shaft at a point located between two of the change-speed gears, whether or not such gears are sliding gears. Similarly, while the engine indicated in Fig. 7 is a radial engine with its crank shaft vertical, my invention is not limited to the use of a radial, vertical-shaft engine in the assembly of Fig. 7, as any engine with its crank shaft disposed transversely of the vehicle may be used.

I claim as my invention:

1. In an automotive vehicle having a front pair of supporting wheels, a rear pair of supporting wheels, a main frame, and an engine, a propeller shaft disposed longitudinally of said main frame and operatively connected to both said front and rear wheels, a gear on said shaft, and change-speed transmission mechanism adapted to be operatively connected to said engine, said change-speed transmission mechanism including driving and driven shafts and a plurality of gear-trains for selectively interconnecting them at different speed-ratios, said gear-trains including elements axially slidable on the driven shaft of said transmission, a gear mounted on said driven shaft for rotation therewith and disposed between said slidable elements and positioned to mesh with said first mentioned gear.

2. In an automotive vehicle having a front pair of supporting wheels, a rear pair of supporting wheels, a main frame, and an engine, a propeller shaft disposed longitudinally of said main frame and operatively connected to both said front and rear wheels, a gear on said shaft, and change-speed transmission mechanism adapted to be operatively connected to said engine, said change-speed transmission mechanism including driving and driven shafts and a plurality of axially spaced means for selectively interconnecting said driving and driven shafts at different speed ratios, a gear mounted on said driven shaft between said speed-changing means and positioned to mesh with said first mentioned gear.

3. In an automotive vehicle, a main frame, supporting wheels for said main frame, said supporting wheels including a pair of drive wheels rotatable on axes extending transversely of said main frame, an engine, a propeller shaft disposed longitudinally of said main frame and approximately perpendicular to the axes of said drive wheels, said propeller shaft being operatively connected to said drive wheels, a gear on said propeller shaft, and change-speed transmission mechanism adapted to be operatively connected to said engine, said change-speed transmission mechanism including driving and driven shafts and a plurality of means spaced axially of the driven shaft for selectively interconnecting said driving and driven shafts at different speed ratios, and a gear mounted on said driven shaft between said speed-changing means and positioned to mesh with said first mentioned gear.

KARL FEILCKE.